United States Patent [19]
Rodi et al.

[11] Patent Number: 4,759,218
[45] Date of Patent: Jul. 26, 1988

[54] TACHOGENERATOR

[75] Inventors: Anton Rodi, Leimen; Walter Hofheinz, Heidelberg, both of Fed. Rep. of Germany

[73] Assignee: Heidelberger Druckmaschinen AG, Heidelberg, Fed. Rep. of Germany

[21] Appl. No.: 943,925

[22] Filed: Dec. 18, 1986

[30] Foreign Application Priority Data

Dec. 18, 1985 [DE] Fed. Rep. of Germany ....... 3544751

[51] Int. Cl.[4] .......................... G01P 1/02; G01P 1/04
[52] U.S. Cl. ............................. 73/493; 250/231 SE
[58] Field of Search .......................... 73/493, 431, 499; 340/347 P; 403/259, 260, 261; 324/164, 167; 411/111, 121, 147, 148, 150, 155, 156; 384/901, 906; 277/136, 137, 174, 175; 33/1 PT; 250/231 SE

[56] References Cited

U.S. PATENT DOCUMENTS

| | | | |
|---|---|---|---|
| 1,320,259 | 10/1919 | Märtens | 411/147 |
| 1,641,059 | 8/1927 | Tausch | 411/155 |
| 3,444,549 | 5/1969 | Margolien et al. | 340/347 P |
| 3,687,184 | 8/1972 | Wagner | 151/37 |
| 3,693,024 | 9/1972 | Hulle et al. | 340/347 P |
| 4,193,199 | 3/1980 | Whiteley et al. | 33/1 PT |
| 4,393,591 | 7/1983 | Conta | 33/1 L |
| 4,495,700 | 1/1985 | Ernst | 33/1 N |

*Primary Examiner*—Stewart J. Levy
*Assistant Examiner*—Robert P. Bell
*Attorney, Agent, or Firm*—Herbert L. Lerner; Laurence A. Greenberg

[57] ABSTRACT

In combination, a tachogenerator of compact construction with a hollow shaft connection and a clamping element for fixing the tachogenerator onto a rotating drive shaft, the tachogenerator includes a stator connected to a stationary machine part for securing the stator against torsion, and a rotor rotatably carrying a coding disk, the rotor being formed in part of the hollow shaft connection and being mountable on the drive shaft so as to be fixed against rotation relative thereto, the stator being mounted, through the intermediary or bearings, on the rotor for free relative rotation therebetween, the rotor having a rear end face, and the rotating drive shaft being formed with a shaft collar, the clamping element bringing the rear end face of the rotor flatly into engagement with the shaft collar formed on the rotating drive shaft.

12 Claims, 2 Drawing Sheets

TACHOGENERATOR

The invention relates to a tachogenerator, especially of compact construction, with a hollow shaft connection and a clamping element for fixing the tachogenerator onto a rotating drive shaft, the tachogenerator havivg a stator connected to a stationary machine part so as to secure it against torsion.

It has become known heretofore to attach shaft encoders to rotating shafts in order to transform the rotary motion of the latter into an electrical signal which represents a rotary speed rate and its direction. Generators which supply analog signals (DC voltage or AC voltage) on the output side or incremental encoders which generate digital information can be used as shaft encoders, as required and depending upon the respective application.

The diameters of the shafts of the drives, e.g. of motors, vary in accordance with the torques to be transmitted. Moreover, conventional generators are not uniformly standardized as to the diameters of the drive shafts, which is true for generators with solid shaft drives and for generators with hollow shaft drives. It is, therefore, difficult to attach tachogenerators to the drive shafts because, on one hand, the different diameters of the drive shaft and the shaft connection of the tachogenerator and, on the other hand, th.e offset of the shafts, concentricity errors and unbalances existing between the shaft and the hollow shaft connection, respectively, of the tachogenerator, on the one hand, and the drive shaft, on the other hand, have to be compensated for.

For this reason, partly rigid and partly elastic couplings mounted between drive shaft and tachogenerator are used, which, however, calls for an undesired extension of the drive shaft and thus the entire motor length. Irrespective of the fact that the space required for this extension is often not available, assembly and disassembly of the tachogenerator is difficult if the mounting clearance is limited, thus causing great expense and being time-consuming. Besides, such a coupling has to be inserted with great care, because the tachogenerator is very susceptible to interference and disruption especially if improperly assembled.

Due to the great reverse play of elastic couplings, their range of application is limited and they are not suited for a reverse operation, e.g. driving printing machines. Particularly with digitally measuring incremental encoders, reverse play is undesirable and leads to false measuring results.

The use of such couplings is unnecessarily if tachogenerators are already equipped with a hollow shaft connection in the form of a clamping ring additionally fastened to the rotor for directly arranging the tachogenerator on the drive shaft. In such a case it is disadvantageous for the clamping ring to project beyond the housing of the tachogenerator, thus enlarging the construction thereof unnecessarily, and twisting the tachogenerator on the drive shaft at least in a slightly eccentric way when tightening the clamping screw which extends through the clamping ring. This slightly eccentric arrangement causes concentricity errors of the coding disk attached to the rotor, which, especially in the case of a fine-coded scale having several thousands of divisions, may lead to false measuring results. Because the scale divisions are formed as circular sectors, the respective width of a scale division, as detected by the reading optics, varies due to the concentricity errors caused by the slightly eccentric rotation of the coding disk, so that, in part, too many and, in part, too few increments are measured.

Consequently, it is the object of the invention to provide with little effort a device for fastening, without a coupling, a tachogenerator to a drive shaft, the device requiring little space and being of relatively simple construction, thus permitting a fast assembly and disassembly of the tachogenerator.

With the foregoing and other objects in view, there is provided, in accordance with the invention, in combination, a tachogenerator of compact construction with a hollow shaft connection and a clamping element for fixing the tachogenerator onto a rotating drive shaft, the tachogenerator comprising a stator connected to a stationary machine part for securing the stator against torsion, and a rotor rotatably carrying a coding disk, the rotor being formed in part of the hollow shaft connection and being mountable on the drive shaft so as to be fixed against rotation relative thereto, the stator being mounted, through the intermediary of bearings, on the rotor for free relative rotation therebetween, the rotor having a rear end face, and the rotating drive shaft being formed with a shaft collar, the clamping element bringing the rear end face of the rotor flatly into engagement with the shaft collar formed on the rotating drive shaft.

By placing the hollow shaft connection into the bore of the tachogenerator and mounting the tachogenerator directly on the drive shaft, a reliable and maintenance-free operation is assured, whereby any reverse play is excluded and construction of a drive of minimum dimensions is tealized. The use of the quick-acting clamping device according to the invention is not only of advantage with respect to production or manufacture thereof but also with respect to the time required for its assembly as compared with conventional devices, and the centrically axial clamping of the tachogenerator to the drive shaft ensures absolute concentricity, thus guaranteeing accurate incremental measuring.

In accordance with another feature of the invention, there is provided a quick-acting clamping device for entraining the rotor on the rotating drive shaft, the clamping device including a spring washer secured against torsion and having a spring force directed axially towards the shaft collar, as well as the clamping element, the clamping element being coaxial with the rotor and being screwable in axial direction.

In accordance with an additional feature of the invention, there are at least two diametrically arranged connections between the stator and the stationary motor housing for securing the stator against torsion, the diametrically arranged connections being resilient yet having a rigidity with respect to the angle of rotation thereof.

The entrainment of the rotor by the drive shaft results either from friction or a form-locking connection therebetween.

The advantages realized by the devices constructed in accordance with the foregoing features are inexpensive production and, in particular, simple assembly and disassembly of the tachogenerator by means of a single tool, e.g. a socket wrench or an Allen key, so that no structural element can be forgotten or be lost.

In accordance with an added feature of the invention, the resilient diametrically arranged connections comprise arresting pins fixed to the stator, and compression spring elements secured to the stationary machine part, the compression spring elements having identical spring characteristics and spring forces directed towards the arresting pins, one of the compression spring elements engaging a respective one of the arresting pins in rotating direction of the drive shaft, and the other of the compression spring elements engaging a respective other of the arresting pins in a direction opposite to the rotating direction of the drive shaft.

In accordance with a further feature of the invention, in standstill condition of the drive shaft, both of the compression spring elements are slightly pretensioned.

In accordance with again another feature of the invention, there is provided a spacer element coaxially mounted on the rotor for limiting travel of the spring washer and preventing plastic deformation thereof when the clamping element is tightened.

A result of the last-mentioned feature of the invention is that, even after many years in use, the tachogenerator can still be easily disassembled from the drive shaft in a minimum of time without any special tool, such as a removing device, for example, because no complicated operations have to be followed, but only a single operation, namely loosening the securing screw, is required.

In accordance with again an added feature of the invention, there is provided a housing for the tachogenerator, the housing being formed in the center thereof with a threaded opening substantially coaxial with the rotor a cover cap receivable in the threaded opening, and means for securing the cover cap over the opening so as to prevent dislodgment of the cover cap.

In accordance with again another feature of the invention, the clamping element is constructed as a clamping screw and is centrally screwable into the end of the drive shaft.

In accordance with again a further feature of the invention, the clamping element has a generally conical construction and is axially displaceable on the drive shaft, and including a clamping nut mounted on the drive shaft and turnable for locking the clamping element on the drive shaft.

In accordance with yet an additional feature of the invention, the rotor is formed with a surface defining the hollow shaft connection, a surface forming a seat for the bearings, and a cylindrical surface whereon the coding disk is mounted, all of the surfaces being machinable so as to avoid concentricity errors from one direction.

In accordance with yet an added feature of the invention, the clamping element is a quick-acting clamping screw, and including a retaining ring mounted on the rotor, the retaining spring washer cooperating to secure the clamping screw against becoming lost.

In accordance with yet another feature of the invention, there are provided U-shaped bent leaf springs secured to the stationary machine part for securing the stator against torsion, the stator having arresting pins attached thereto and projecting play-free into the leaf springs.

In accordance with yet a further feature of the invention, the clamping element forms a quick-acting clamping device having means for exerting a radial clamping force as well as a clamping force applied in a direction towards the shaft collar.

In accordance with a concomitant feature of the invention, the drive shaft is continuous and is formed with a groove, and including a fitting ring received in the groove and forming an abutment serving as a shaft collar.

Other features which are considered as characteristic for the invention are set forth in the appended claims.

Although the invention is illustrated and described herein as embodied in a tachogenerator, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings, in which.

Figure 1:
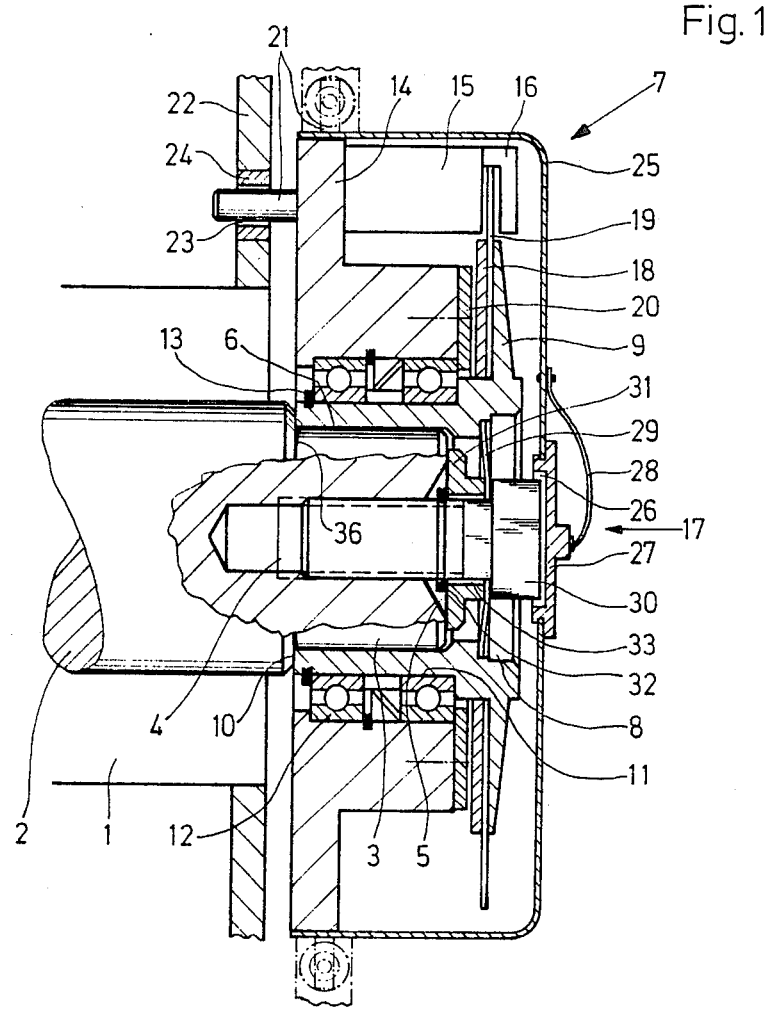
FIG. 1 is a cross-sectional view of a tachogenerator fastened to a drive shaft by a quick-acting clamping device.

Referring now to the drawing and, first, particularly, to FIG. 1 thereof, there is shown a drive shaft 2 protruding from a drive motor 1 and provided with a cylindrically recessed or stepped shaft end 3 having a centrically incised female thread 4 formed with a deep counter-sinking 5 at an end face of the drive shaft 2. A tachogenerator 7 is arranged on the shaft end 3 by means of a hollow shaft connection 6.

The hollow shaft connection 6, preferably provided with a transition fit, is part of a stepped bore 8 which extends through a rotor 9 constructed as a rotary member. By means of the transition fit (sliding fit), the rotor 9, which has a rear face 36 abutting a shaft collar 10, is seated on the stepped shaft end 3. On the side facing the drive motor 1, the rotor 9 is equipped with a stepped or recessed bearing seat 11 on which ball bearings 12 are arranged. Towards the side at which the motor 1 is located, one of the ball bearings 12 is braced by a Seeger ring or circlip 13 which is inserted into the bearing seat 11 in front of the shaft collar 10.

On the ball bearings 12 a stator 14 is arranged which serves as a holder for a photoelectronic scanning unit formed of a transmitter 15 and a receiver 16 between which there rotates a coding disk 19 which is fixed to the rotor 9 by means of a locking ring 18.

The structural connection between the stator 14 and the rotor 9 is realized by a bearing fastening ring 20 which is fastened to that side of the stator 14 facing towards the coding disk 19 and, accordingly, covering one of the two ball bearings 12 laterally. An arresting pin 21, which has been inserted and extends from the stator 14, projects into a bore 23 which is formed in a housing 22 of the drive rotor 1, thereby securing the stator 14 and the photoelectronic scan unit attached thereto against torsion or twisting in circumferential direction. Preferably, a fitting or set pin is used as the arresting pin 21 and the bore 23 is provided with an elastic lining e.g. in form of a rubber sleeve 24, for compensating for tolerances. It may also be appropriate to form the bore 23 as a radial seat.

Furthermore, a generator housing 25 enclosing the entire generator assembly and centrically provided with a threaded opening 26 is fastened to the stator 14. A cover cap 27, preferably formed of rubber or synthetic material, is insertable into the threaded opening 26 in otder to prevent ingress of dust and impurities, the cover cap 27 being secured against falling out by means of an elastic cover-cap holder 28 e.g. in the form of a spring saddle or extremity shoe, which is pivotally fastened to the generator housing 25.

In the center of the tachogenerator 7, there is arranged a two-part quick-acting clamping device 17 formed of a spring washer 29 having a spring force which is directed towards the front end face of the drive shaft 2, and a quick-acting clamping screw 30 extending through the spring washer 29. It is advantageous to use a commercially available screw as the quick-acting clamping screw 30 which is inserted through the threaded opening 26 of the generator housing 25 and threadedly received by the female thread 4 of the drive shaft 2, the female thread 4 usually being already present so that it is unnecessary to machine it especially for this purpose. On the clamping screw 30, there are arranged in succession the spring washer 29, a spacer sleeve 31 and a retaining ring 32, as viewed from the head of the clamping screw 30. The spring washer 29 is constructed as a concentric and expandable or spreadable spring washer and is preferably fastened formfitting or positively to one step within the stepped bore 8 of the rotor 9 e.g. by pointwise flanging ot beading of the bore step to the spring washer 29, by spot welding, riveting and the like to secure the spring washer torsion. The spacer sleeve 31 has a length precisely adjusted to the respective conditions i.e. to the length of the stepped shaft end 3 of the drive shaft 2 as well as to the construction width and the bore 8 of the tachogenerator 7. Furthermore, the spacer sleeve 31 is formed with a bore 33 having an inner diameter which is slightly smaller than the outer diameter of the retaining ring 32 arranged thereafter. A conventional O-ring or preferably a steel ring can be used as the retaining ring 32.

It is advantageous for the manufacturer to assemble beforehand the quick-acting clamping device 17 with the tachogenerator 7, in accordance with the customer's specifications, into one unit which can be taken apart only by means of a tool. In this case, the retaining ring 32, in connection with the formfitting or positive attachment of the spring washer 29 in the rotor 9, prevents the quick-acting clamping device 17 from separating from the tachogenerator 7. Of course it is possible, as well, for the user himself to fasten the spring washer 29 in the rotor 9, stick the quick-acting clamping screw 30 through the spring washer 29, place the precisely fitted spacer sleeve 31 on the clamping screw 30 and finally insert the retaining ring 32 into the threaded shank of clamping screw 30.

Before the actual assembly of the tacohgenerator 7, the cover-cap holder is pivoted away, and the cover cap 27 is removed from the screw opening 26. The tachogenerator 7 is then placed upon the cylindrically stepped or recessed shaft end 3 of the drive shaft 2 in such a way that the arresting pin 21 is situated opposite the bore 23 formed in the motor housing 22. Thereafter, the quick-acting clamping screw 30 is gradually tightened with a conventional wrench, whereby the rotor 9 slides itself with its hollow shaft connection 6 onto the cylindrically stepped shaft end 3 until the rear end face 36 of the rotor 9 abuts the shaft collar 10 and the arresting pin 21 engages in the bore 23.

In the tightened condition of the quick-acting clamping screw 30, the retaining ring 32 comes to life in vicinity of the countersinking 5 of the female thread 4 of the drive shaft 2, and the drive of the rotor 9 is secured not only by friction but also form-fittingly or positively by the fastening of the spring washer 29 in the rotor 9. It is practically impossible to overwind or excessively turn the spring washer 29 due to applying too great a tightening torque of the quick-acting clamping screw 30, because the spacer sleeve 31 is of such length that the spring washer 29 is unable to deform itself plastically, the spring pressure rediured for maintenance of the friction and directed towards the drive shaft 2 thereby remaining undiminished, independently of the tightening torque of the quick-acting clamping screw 30.

Disassembly of the tachogenerator 7 is effected in one single operation, namely simply by untightening the quick-acting clamping screw 30. The instant the retaining ring 32, after a few loosening turns of the quick-acting clamping screw 30, contacts the spacer sleeve 31, it acts as a device for removing the tachogenerator 7 from the drive shaft 2. Upon further unscrewing of the quick-acting clamping screw 30, the spacer sleeve 31 presses against the spring washer 29 which is form-fittingly or positively fastened in the rotor 9, thereby effecting a loosening and withdrawl of the tachogenerator 7 from the cylindrically stepped or recessed shaft end 3.

Because both during assembly as well as during disassembly only one single operation is required which, due to its simplicity, excludes any errors, it can be performed by untrained personnel, at least under supervision. Due to the precisely fitting concentric arrangement of the tachogenerator 7 on the drive shaft 2 to which it is absolutely centrically clamped, concentricity errors rarely occur. If minor tolerances should nevertheless exist, whether in axial or radial direction, these are absorbed by the rubber sleeve 24 of the bore 23 in the motor housing 22 and compensated for. The possibility of clamping the tachogenerator 7 onto the drive shaft 2 with a great tightening torque, in connection with the construction of the arresting pin 21 as a fitting pin with an appertaining bore 23 formed in the motor housing 22, keeps reverse play within such low limits, so that there is no noticeable influence on the incremental measuring values, even if a fine-coded pulse disk is used.

Figure 2:
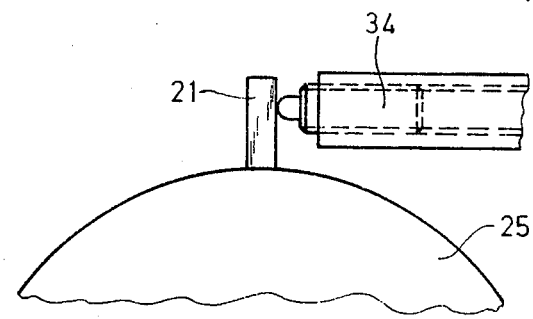
FIG. 2 is a fragmentary view of FIG. 1 as seen from the righthand side thereof showing elastic means for securing the tachogenerator against torsion in accordance with the invention.

As is apparent from FIG. 2, the securing of the stator 14 against torsion or twisting can also be effected by a differently constructed spring connection and, in fact, the arresting pins 21 fixed to the stator 14 strike against the compression spring elements 34 fastened to the rotor housing 22. The compression spring elements 34 have identical spring characteristics. The spring force thereof acts in the direction of the respective striking arresting pin 21, one of the compression spring elements 34 engaging fhe respective arresting pin 21 in rotating direction and the other of the compression spring elements 34 opposite the rotating direction of the drive shaft 2. It is advantageous, if both of the compression spring elements 34 are already under slight tension at standstill of the shaft.

Figure 3:
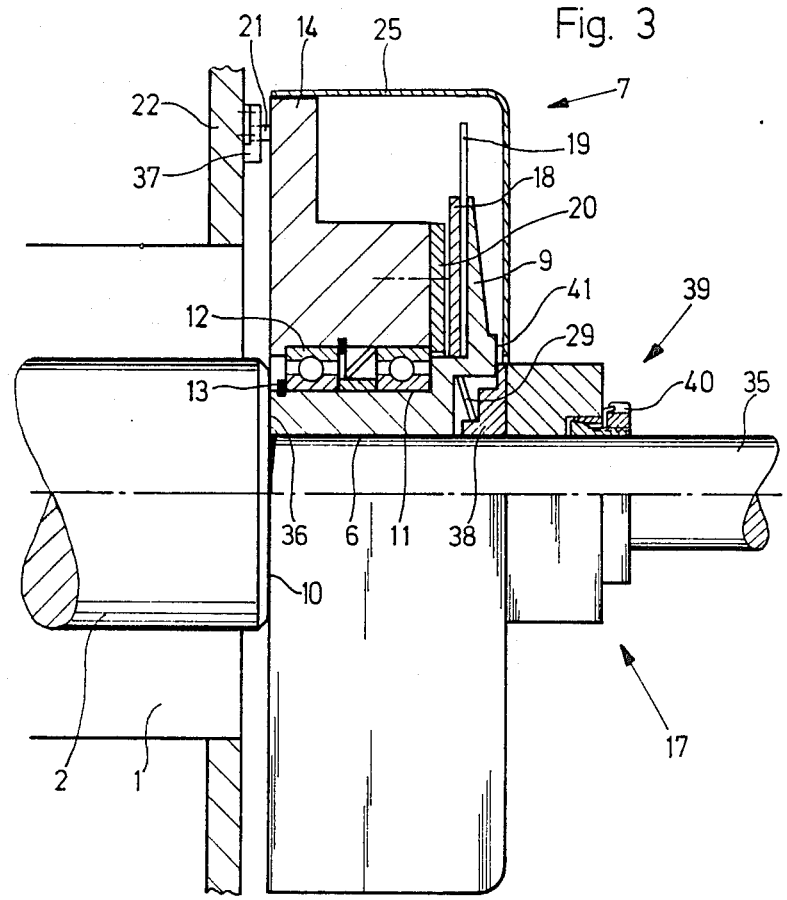
FIG. 3 is a view similar to that of FIG. 1 of another embodiment of the invention wherein the tachogenerator is attachable to a continuous shaft in accordance with the invention.

The attachment or mounting of the tachogenerator 7 according to the invention onto a continuous shaft is illustrated in FIG. 3. The drive shaft 2 of the drive motor 1 is stepped or offset with respect to the continuous shaft 35 and thereby forms the shaft collar 10 with which the rear and face 36 of the rotor 9 is in flush contact. The hollow shaft connection 6 of the rotor 9, in contrast with the construction according to FIG. 1, is constructed as a continuously cylindrical bore and is slid by means of a sliding fit over the hollow shaft 35. The construction of the rotor 9 of FIG. 3 corresponds substantially to the one described with respect to FIG. 1. The coding disk 19 is mounted onto the rotor 9 in the same way with an arresting ring 18. The stator 14 of FIG. 3 has practically the same construction as in the afore-described example of FIG. 1 and is mounted via both ball bearings 12 on the rotor 9. In this case, too, each of the ball bearings is secured in axial direction on the one side by a Seeger ring or circlip 13 and on the other side by the bearing fastening ring 20 fastened to the stator 14. The entire interior of the tachogeneratot 7 is covered by a generator housing 25 firmly connected to the stator 14.

By means of a cone clamping element 39, the rotor 9 is pressed via a stepped clamping ring 38 and the expandable spring washer 29 in axial direction towards the shaft collar 10 of the drive shaft 2. The quick-acting clamping device 17 is formed by the cone clamping element 39 and the spring washer 29. In order to ensure that the rear end face 36 of the rotor 9 is in planar or flat contact with the shaft collar 10, the cone clamping element 39 is displaced on the continuous shaft 35 in axial direction towards the motor, before it is clamped, until the stepped clamping ring 38 comes to rest against the front end face 41 of the rotor 9. The instant this occurs, by turning the clamping nut 40, the cone clamping element 39 is clamped on the continuous shaft 35 so as not to be displaceable. The expandable spring washer 29 is then under such tension that it exerts enough force in radial and axial direction to bring the rear face 36 of the rotor 9 in flush contact with the shaft collar 10 of the drive shaft 2. In this way, the rotor 9, which carries the coding disk 19, is able to be mounted impact and torsion-free on the drive shaft 2.

Figure 4:
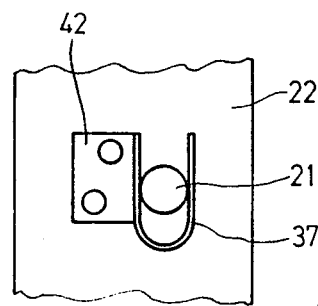
FIG. 4 is a fragmentary top plan view of FIG. 3 showing another elastic means for securing the tachogenerator against torsion.

The cone clamping element 39 being used as part of the quick-acting clamping device 17 is available on the free market, e.g. from the German firm Ringspann Tollok For the purpose of securing the statlor 14 against torsion, there is provided, as shown in FIG. 4, a U-shaped bent leaf spring 37 firmly riveted to the motor housing 22 via an angled holding plate 42. The arresting pin 21 fastened to the stator 14 is inserted free from play into the U-shaped leaf spring 37. FIG. 3 shows only one device which secures against torsion; however, two such securing devices, for example, can also be provided.

Of course, as aforementioned, the invention is not limited to the embodiments illustrated in the drawings and set forth in the description, which should merely be viewed as examples not limiting the invention. It goes witnout saying that various constructions and especially the use of equivalent mechanical parts lie within the scope of this invention. For example, a continuous drive shaft 2 can be provided which is grooved for receiving a fitting ring which assures the function of the shaft collar 10.

The foregoing is a description corresponding in substance to German Application No. P 35 44 751.6, dated Dec. 18, 1985, the International priority of which is being claimed for the instant application, and which is hereby made part of this application. Any material discrepancies between the foregoing specification and the aforementioned corresponding German application are to be resolved in factor of the latter.

We claim:

1. In combinataion, a tachogenerator of compact construction with a hollow shaft connection and a clamping element for fixing the tachogenerator onto a rotating drive shaft, the tachogenerator comprising a stator connected to a stationary machine part for securing said stator against torsion, a rotor rotatably carrying a coding disk, said rotor being formed in part of the hollow shaft connection and being mountable on the drive shaft so as to fixed against rotation relative thereto, said stator being mounted, through the intermediary of bearings, on said rotor for free relative rotation therebetween, said rotor having a rear end face, and the rotating drive shaft being formed with a shaft collar, the clamping element bringing said rear end face of said rotor flatly into engagement with said shaft collar formed on the rotating drive shaft, a quick-acting clamping device for entraining said rotor on the rotating drive shaft, said clamping device including a spring washer secured against torsion and having a spring force directed axially towards said shaft collar as well as the clamping element, the clamping element beincg coaxial with said rotor and being screwable in axial direction, and a spacer element coaxially mounted on said rotor for limiting travel of said spring washer and preventing plastic deformation thereof when said clamping element is tightened.

2. The combination according to claim 1, including at least two diametrically arranged connections between said stator and said stationary machine part for securing said stator against torsion, said diametrically arranged connections being resilient yet having a rigidity with respect to the angle of rotation thereof.

3. The combination according to claim 2, wherein said resilient diametrically arranged connections comprise arresting pins fixed to said stator, and compression spring elements secured to the stationary machine part, said compression spring elements having identical spring characteristics and spring forces directed towards said arresting pins, one of said compression spring elements engaging a respective one of said arresting pins in rotating direction of the drive shaft, and the other of the compression spring elements engaging a respective other of said arresting pins in a direction opposite to the rotating direction of the drive shaft.

4. The combination according to claim 3, wherein, in standstill condition of the drive shaft, both of said compression spring elements are slightly pretensioned.

5. The combination according to claim 1 including a housing for the tachogenerator, said housing being formed in the center thereof with a threaded opening substantially coaxial with said rotor, a cover cap receivable in said threaded opening, and means for securing said cover cap over said opening so as to prevent dislodgment of said cover cap.

6. The combination according to claim 1 wherein the clamping element is constructed as a clamping screw and is centrally screwable into the end of the drive shaft.

7. The combination according to claim 1 wherein the clamping element has a generally conical construction and is axially displaceable on the drive shaft, and including a clamping nut mounted on the drive shaft and turnable for locking the clamping element on the drive shaft.

8. The combination according to claim 1 wherein said rotor is formed with a surface defining said hollow shaft connection, a surface forming a seat for said bearings, and a cylindrical surface whereon said coding disk is mounted, all of said surfaces being machinable so as to avoid concentricity errors from one direction.

9. The combination according to claim 2, wherein said clamping element is a quick-acting clamping screw, and including a retaining ring mounted on said clamping screw, said retaining ring and said spring washer cooperating to secure said clamping screw against becoming lost.

10. The combination according to claim 1, including U-shaped bent leaf springs secured to the stationary machine part for securing said stator against torsion, said stator having arresting pins attached thereto and projecting play-free into said leaf springs.

11. The combination according to claim 1, wherein said clamping element is a quick-acting clamping device having means for exerting a radial clamping force as well as a clamping force applied in a direction towards said shaft collar.

12. The combination according to claim 1, wherein the drive shaft is continuous and is formed within a groove, and including a fitting ring received in said groove and forming an abutment serving as a shaft collar.

* * * * *